United States Patent
Radewagen et al.

(10) Patent No.: US 10,773,737 B2
(45) Date of Patent: Sep. 15, 2020

(54) TRACTION-IMPACT DEVICE AND FORCE TRANSMISSION UNIT HAVING SUCH A TRACTION-IMPACT DEVICE

(71) Applicant: Voith Patent GmbH, Heidenheim (DE)

(72) Inventors: Christian Radewagen, Salzgitter (DE); Kay Uwe Kolshorn, Wolfenbüttel (DE); Mathias Romund, Engelschoff (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/448,463

(22) Filed: Jun. 21, 2019

(65) Prior Publication Data
US 2019/0308645 A1 Oct. 10, 2019

Related U.S. Application Data

(63) Continuation of application No. PCT/EP2017/079598, filed on Nov. 17, 2017.

(30) Foreign Application Priority Data

Dec. 23, 2016 (DE) .......................... 10 2016 125 554

(51) Int. Cl.
*B61G 11/16* (2006.01)
*B61G 7/10* (2006.01)
(Continued)

(52) U.S. Cl.
CPC .............. *B61G 11/16* (2013.01); *B61D 15/06* (2013.01); *B61G 7/10* (2013.01); *B61G 11/18* (2013.01); *F16D 3/62* (2013.01); *B61G 7/14* (2013.01)

(58) Field of Classification Search
CPC .......... B61G 11/16; B61G 11/18; B61G 7/10; B61G 7/14; B61D 15/06; F16D 3/62
See application file for complete search history.

(56) References Cited

U.S. PATENT DOCUMENTS 10,124,816 B2 * 11/2018 Nagahara .................. F16F 7/12
10,676,114 B2 * 6/2020 Sano ...................... B60R 19/26
(Continued)

FOREIGN PATENT DOCUMENTS

| CH | 130824 | 12/1928 |
| EP | 1 905 661 A1 | 4/2008 |
| WO | 2009/034123 A1 | 3/2009 |

OTHER PUBLICATIONS

Notice of Transmission of the International Research Report and the Written Notice Issued the International Searching Authority or Declaration dated Mar. 6, 2018 for International Application No. PCT/EP2017/079598 (12 pages).

*Primary Examiner* — Jason C Smith
(74) *Attorney, Agent, or Firm* — Taylor IP, P.C.

(57) ABSTRACT

A traction-impact device including two force transmission elements which extend along a longitudinal axis and which are connected to each other in a force-transmitting manner and an irreversible energy absorption device that includes at least one energy absorption element which at least partially or in regions, preferably completely, includes a fiber composite material. The irreversible energy absorption device is at least partially received by a first of the two force transmission elements. This first force transmission element includes a nozzle portion. The irreversible energy absorption element is arranged in such a manner with respect to the nozzle portion and the other second force transmission element that, when an impact force which exceeds the maximum permissible impact force is introduced into the traction-impact device, the irreversible energy absorption element is pressed through the nozzle portion with at least partial, preferably complete defibration of the regions formed from fiber composite material.

20 Claims, 5 Drawing Sheets

(51) Int. Cl.
*B61G 11/18* (2006.01)
*F16D 3/62* (2006.01)
*B61D 15/06* (2006.01)
*B61G 7/14* (2006.01)

(56) References Cited

U.S. PATENT DOCUMENTS

| | | | | |
|---|---|---|---|---|
| 2008/0041268 A1* | 2/2008 | Seitzberger | ............... | F16F 7/12 |
| | | | | 105/392.5 |
| 2008/0236440 A1* | 10/2008 | Nakamura | ............. | B61G 11/16 |
| | | | | 105/392.5 |
| 2009/0000506 A1* | 1/2009 | Jaede | ..................... | B61G 11/16 |
| | | | | 105/392.5 |
| 2011/0062730 A1* | 3/2011 | Beika | ....................... | F16F 7/12 |
| | | | | 293/120 |
| 2011/0162555 A1* | 7/2011 | Hayashi | ................. | B61D 15/06 |
| | | | | 105/392.5 |
| 2012/0325108 A1* | 12/2012 | Graf | ....................... | B61D 15/06 |
| | | | | 105/392.5 |
| 2015/0069003 A1* | 3/2015 | Watts | ..................... | B61G 11/16 |
| | | | | 213/221 |
| 2015/0158508 A1* | 6/2015 | Le Corre | ................. | B61G 9/00 |
| | | | | 213/64 |
| 2016/0152247 A1* | 6/2016 | Sano | ....................... | F16F 7/126 |
| | | | | 105/392.5 |
| 2016/0347333 A1* | 12/2016 | Lenzi | ..................... | B61G 11/16 |
| 2017/0174234 A1* | 6/2017 | Koerner | ................. | B61D 15/06 |
| 2017/0197641 A1* | 7/2017 | Grahn | ..................... | B61G 9/04 |
| 2018/0162304 A1* | 6/2018 | Heinzl | .................... | B60R 19/03 |
| 2019/0308645 A1* | 10/2019 | Radewagen | ........... | B61G 11/16 |
| 2019/0337538 A1* | 11/2019 | Richmond | ............. | B61G 11/08 |
| 2020/0189627 A1* | 6/2020 | Zurawski | ............... | B61G 11/16 |

* cited by examiner

TRACTION-IMPACT DEVICE AND FORCE TRANSMISSION UNIT HAVING SUCH A TRACTION-IMPACT DEVICE

CROSS REFERENCE TO RELATED APPLICATIONS

This is a continuation of PCT application No. PCT/EP2017/079598, entitled "TRACTION/IMPACT DEVICE AND FORCE TRANSMISSION UNIT HAVING SUCH A TRACTION/IMPACT DEVICE", filed Nov. 17, 2017, which is incorporated herein by reference.

BACKGROUND OF THE INVENTION

1. Field of the Invention

The present invention relates to rail-bound vehicles, and more particularly to a traction-impact device for a rail-bound vehicle.

2. Description of the Related Art

Force transmission units in the form of coupling rods, in particular for use in rail-bound vehicles for transmitting forces between a coupling head and a connection element for at least indirect connection to a carriage body, for example, a bearing block having traction-impact devices, are known in the prior art in different configurations. Such coupling rods can depending on requirements be provided with reversible and/or irreversible energy absorption in addition to the force transmission function. The coupling rods may include two force transmission elements which are coupled to each other so as to transmit forces. Reversible energy absorption devices are in this instance arranged at least indirectly, that is to say, directly or with other components being interposed between the two force transmission elements, in such a manner that they can absorb the energy of a coupling impact by way of reversible length change. This is generally carried out as far as a critical load. In order in the event of an overload, that is to say, when a maximum permissible impact force is exceeded, not to direct the force introduced into the coupling rod in a non-impeded manner to the subsequent connection elements with significant damage thereto or to the connection environment, irreversible energy absorption devices are provided. These are deformation elements, which are used in the event of an overload and which are characterised by a constant and definable load over the entire deformation path thereof. In this instance, depending on the embodiment and principle, the energy introduced by the overload is used in plastic deformation work or for peeling. There are thus used, for example, steel deformation pipes which are expanded in an elastoplastic manner by way of a tapered ring.

From WO 2009/034123 A1 an impact protection device is known and is suitable in particular for use as an additional irreversible impact protection stage together with a component for force transmission. This impact protection device has an energy absorption element in the form of a deformation pipe and a counter-element in the form of a force transmission element. The counter-element (force transmission element) cooperates in this instance with the energy absorption element in such a manner that after a characteristic impact force which can be determined beforehand has been exceeded, the energy absorption element which is constructed as a deformation pipe is plastically deformed and in this instance breaks down at least a portion of the energy which occurs during the impact force transmission. During the plastic deformation of the deformation pipe, the deformation pipe (energy absorption element) and the force transmission element (counter-element) move towards each other in relation to each other.

Such embodiments are configured in such a manner that the plastic deformation is also already intended to be taken into account in the design and is generally also not able to be readily removed following a crash. After a response, in particular in the event of a crash, the entire force transmission element is then generally intended to be produced again. The deformation capacity is also connected with the material properties and geometry and sizing of these steel pipes so that the energy input which is intended to be converted into deformation work is often limited by structural space provisions. Since with an expansion, generally only a limited shortening takes place, the use with very little structural space being available cannot be produced in a simple manner.

What is needed in the art is a cost-effective and energy efficient an objective forming the basis of the present invention therefore involves providing a impact device.

SUMMARY OF THE INVENTION

The present invention provides a traction-impact device which, in addition to force transmission during normal operation, in the event of a crash also enables the absorption of significant forces in a short installation space which is available. In the event of a crash, the irreversible energy absorption in the event of a response should if possible not impair the other components, in particular the force transmission elements, so that they have a high recycling potential for reconstruction of the traction-impact device.

A traction-impact device, in particular for couplings of track-guided vehicles having two force transmission elements which extend along a longitudinal axis and which are connected to each other in a force-transmitting manner in order to transmit traction and impact forces and which, when a maximum permissible impact force is exceeded, can be moved relative to each other has an irreversible or destructive energy absorption device which is constructed and arranged so as to respond when a maximum permissible impact force is exceeded. According to the invention there is provision for the irreversible energy absorption device to comprise at least one energy absorption element which at least partially or in regions, for example completely, comprises a fibre composite material, in particular fibre/plastics composite material, and the irreversible energy absorption device is at least partially received by a first of the two force transmission elements. This first force transmission element has or forms a nozzle portion. The irreversible energy absorption element is arranged in such a manner with respect to the nozzle portion and the other second force transmission element that, when an impact force which exceeds the maximum permissible impact force is introduced into the traction-impact device, the irreversible energy absorption element is pressed through the nozzle portion with at least partial, for example complete defibration of the regions formed from fibre composite material.

A traction-impact device is in particular intended to be understood to be a device via which traction forces and impact forces up to a maximum permissible size can be transmitted between two connection elements. That is to say, it is in particular intended to be understood to be a device which can be arranged in the force path between two connection elements as a force transmission device and which enables the transmission of forces from one force transmission element to the other.

The term "element" is intended to be understood to be functional. This relates both to the construction as a single component and to the composition of a plurality of components to form one component which serves to carry out a specific function. A force transmission element may therefore be constructed with one or several pieces.

A fibre composite material is generally intended to be understood to be a multi-phase or mixed material which comprises an embedding matrix and reinforcing fibres. The function of the matrix involves retaining the fibres in a predetermined position, transmitting tensions between the fibres and protecting the fibres from external influences. The reinforcement fibres are responsible for the load-bearing mechanical properties. Glass and carbon fibres are particularly suitable as reinforcement fibres.

According to the present invention, at least a portion of the impact energy which is introduced into the traction-impact device is dissipated by the energy absorption element not similarly to energy absorption elements of steel being plastically deformed, but instead at least partially being broken up into individual pieces. That is to say, when the energy absorption device responds, the impact energy which is introduced therein is used to defibrate the fibre composite material regions and is consequently at least partially dissipated. Since the defibration and pulverisation in comparison with conventional plastic deformation require significantly more energy, the traction-impact device according to the invention is in particular also suitable for applications in which high weight-specific impact energies are intended to be dissipated. The term defibrating a region of the irreversible energy absorption element which is formed from a fibre composite material is therefore in particular intended to be understood to be a destruction of the fibre structure of the fibre composite material or the region of fibre composite material, wherein a breakup thereof into individual portions, in particular fragments as far as pulverisation is carried out.

The present invention enables the integration of an irreversible energy absorption in order to absorb very high forces also when little structural space is available in a traction-impact device. As a result of the at least partial construction of the irreversible energy absorption element of fibre composite material, the energy absorption can be adjusted in a defined manner and the damage which otherwise occurs to the force transmission elements with plastic deformation of steel pipes known from the prior art can be prevented. The use of an energy absorption element formed from fibre composite material further has a lightweight construction, which can be used to reduce the overall weight of the traction-impact device.

A hollow space region may be provided, in the first force transmission element when viewed in the drive direction of the energy absorption element through the nozzle portion, in the region of the nozzle portion and/or downstream of the nozzle portion. In the wall of the first force transmission element, at least one, for example a plurality of through-openings which is/are arranged in the peripheral direction of the first force transmission element and which extend(s) through the wall of the hollow space region to the outer periphery is/are provided. The individual through-opening is arranged and constructed so as to discharge the fibres or fragments which are produced by pressing the irreversible energy absorption element through the nozzle portion at least partially, for example completely to the outer side of the first force transmission element. As a result of the spatially close discharge of the fragments and fibres which occur during defibration, a blockage by the fragments and fibres which are continuously produced by the also longer energy absorption elements is prevented. This enables traction-impact devices with a very compact construction, in particular with little length in the longitudinal direction, since the nozzle regions do not have to be associated with any large hollow space regions for receiving the fragments and fibres which are produced during defibration and the energy absorption elements when viewed in the longitudinal direction of the traction-impact device can nonetheless be constructed to be relatively long and consequently provide a high energy absorption capacity.

Additionally or alternatively to the above-mentioned embodiment, the traction-impact device can be provided with discharge openings which are constructed as through-openings, the hollow space region which is provided in the first force transmission element in the region of the nozzle portion and/or downstream of the nozzle portion is constructed and arranged so as to at least partially, for example completely receive the fibres or fragments which are produced when the irreversible energy absorption element is pressed through the nozzle portion. In the latter case, it is possible to completely dispense with the through-openings which act as discharge openings.

In an advantageous manner, the properties of such energy absorption elements of fibre composite material may be adapted in a defined manner to the load to be anticipated as a function of at least one of the variables mentioned below:

fibre architecture and/or layer structure of the fibres,
shape and/or sizing.

It is thus possible to preadjust the strength and the response behaviour of the energy absorption device in a defined manner by the proportion of the fibres which are placed in the direction of the impact force transmission being varied.

With respect to the construction of the individual irreversible energy absorption element, there are in principle a plurality of possibilities. It may be constructed as an element selected from the following group of elements:

hollow member, in particular hollow member having a cylindrical or elliptical cross-section,
sleeve,
solid profile element.

In this instance, the individual irreversible energy absorption element may be constructed when viewed over the extent thereof along the longitudinal axis with a constant or changeable cross-section.

The irreversible energy absorption device may be formed by an individual irreversible energy absorption element or a plurality thereof. In the first case, the individual energy absorption element is according to an embodiment arranged for uniform energy absorption coaxially with respect to the force transmission elements or the longitudinal axis. This element may then be constructed symmetrically, in particular in a rotationally symmetrical manner.

In the second case, a plurality of irreversible energy absorption elements are provided. With a selected arrangement in series, these are arranged one behind the other and mutually respond when acted upon. The overall absorption capacity is determined by the sum of the individual absorption capacities. This solution enables for traction-impact devices of different extents in the longitudinal direction the use of standardised irreversible energy absorption elements by combining them and consequently reduces the diversity of components.

With a parallel arrangement, the individual energy absorption elements may in a first embodiment be at least partially arranged to be fitted one inside the other with respect to their extent in the longitudinal direction of the traction-impact device. These elements may be constructed and arranged when viewed in the direction of the longitudinal axis either completely overlapping each other with respect to their extent range in this direction. On the other hand, it is possible, in order to achieve a response which is carried out successively and in order to influence the size and the path of the energy absorption, to construct the individual energy absorption elements with different extents in the longitudinal direction of the traction-impact device.

In a second embodiment of the parallel arrangement, the first force transmission element which has a nozzle portion has a large number of individual nozzle elements which are arranged in the peripheral direction about the longitudinal axis. The irreversible energy absorption device comprises a large number of such energy absorption elements which are arranged parallel with each other, wherein the arrangement is carried out in a peripheral direction about the longitudinal axis spaced apart from each other. The arrangement, in particular association with the nozzle elements, is carried out so as to be pressed through the individual nozzle elements when the maximum permissible impact force is exceeded.

The arrangement and association of the irreversible energy absorption element with respect to the first force transmission element may be carried out in different manners. In a first variant, the individual irreversible energy absorption element is arranged outside the force path and is guided on the first force transmission element in a manner free from a connection thereto. In the simplest case, the irreversible energy absorption element is introduced into the first force transmission element only with a clearance fit.

In a second variant, in order to fix it in position, the individual irreversible energy absorption element is guided on the first force transmission element and/or second force transmission element or an element which is at least indirectly acted on with force by the second force transmission element for acting on the energy absorption element.

In the third variant, the individual irreversible energy absorption element is secured to the first force transmission element or is arranged in a pretensioned manner between this element and the second force transmission element or the element which is acted on thereby. The securing to the first force transmission element can be carried out by way of non-positive-locking, positive-locking or material engagement. In the simplest case, the irreversible energy absorption element is merely adhesively bonded for fixing in position.

With respect to the structural configuration of the force transmission elements, a large number of possibilities are conceivable. In one embodiment, the first force transmission element is constructed as a hollow member which is open at least at one side, for example a tubular member, and the second force transmission element is constructed as a pull rod, wherein the pull rod is received by the first force transmission element with the end region thereof facing the first force transmission element. Both are coupled to each other by way of a force-transmitting connection at least indirectly, that is to say, either directly or with additional elements being arranged therebetween in the force path. In order to act on the irreversible energy absorption element, an impact element is provided. This element is formed either directly by the second force transmission element or the second force transmission element acts thereon under the influence of a force which exceeds the maximum permissible impact force in such a manner that, via the impact element, this increased force is introduced into the irreversible energy absorption element.

The force-transmitting connection between the first and second force transmission elements is carried out, in one embodiment, directly, wherein in the connection there is integrated a desired breaking location which responds at the maximum permissible impact force and which, with the force-transmitting connection being cancelled, permits a relative movement of the first and second force transmission elements with respect to each other. The desired breaking location is in the simplest case provided by the connection devices. These comprise, for example, shear elements in the form of shear bolts. Other embodiments are conceivable, for example, materially integral connections via weld seams, etcetera. The pull rod has in this instance a region which in addition to the function of producing a connection to the first force transmission element also provides a surface region for cooperation with the irreversible energy absorption element. This is produced in the simplest case by way of an integral flange or a region with a cross-section increase. A flange element which can be connected separately to the pull rod is also possible.

If the connection is not carried out directly, in a development of all the above-described embodiments, the force-transmitting connections between the first and second force transmission elements can be carried out in the traction force direction with a damping device being interposed. Alternatively but also additionally, the force-transmitting connection is carried out in the impact force direction with a damping device being interposed. The damping devices are in this instance constructed as reversible energy absorption devices, wherein the individual damping device is constructed as a device selected from the following group:

resilient device,
gas hydraulic damping device,
hydrostatic damping device,
or a combination of the above.

These enable an absorption of coupling impacts by way of reversible length change.

In these embodiments, there is provided, for example, a disc-like or plate-like element which forms a pressure plate and which is connected to the first force transmission element in an impact direction upstream of the nozzle portion when viewed in a longitudinal direction, and has a surface region for acting on the irreversible energy absorption element. In this instance, the pressure plate takes on two functions, specifically it is a component of the force-transmitting connection and, on the other hand, it forms the impact element when this connection is cancelled for the irreversible energy absorption element. The pull rod is to this end guided by the pressure plate and has a traction stop and a pressure stop, wherein they are arranged spaced apart from each other in an axial direction, that is to say, longitudinal direction of the pull rod. In the connection between the pressure plate and a force transmission element, a desired breaking location is provided. The pressure plate may to this end be constructed integrally with the force transmission element and the desired breaking location may be produced by way of a significant cross-sectional change. However, this may be constructed as a separate component which is connected by way of connection devices, for example by way of shear devices, to the force transmission element. The pressure plate has a surface region for cooperation with the traction stop of the pull rod for transmitting force in a traction force direction, a surface region for cooperating with the pressure stop of the pull rod for transmitting force in an impact direction. These surface regions are arranged at different end sides of the pressure plate.

As already set out, another reversible energy absorption device may further be provided between the traction stop and pressure plate or between the pressure stop and pressure plate.

In all the embodiments, when a predefined maximum permissible impact force is exceeded, the connection is cancelled with relative movement of the force transmission elements, preferably with respect to each other, wherein in this instance either the second force transmission element acts directly or via the pressure plate as an actuation element on the irreversible energy absorption element.

Of course, the functions of the first and second force transmission elements may also be interchanged with respect to their association with the pull rod and counter-element. The terms first and second force transmission element in this instance do not determine the direction of the force path but instead serve to differentiate the two.

The construction of the nozzle portion may in all embodiments be carried out integrally on the force transmission element, that is to say, either by way of cross-sectional tapering or by provision of a projection. The nozzle portion may further be formed by a separate component which is received by the force transmission element. It may then be connected, for example, in a non-positive-locking, positive-locking or materially engaging manner to the force transmission element for positional fixing. The nozzle may in this instance be formed, for example, with a constant cross-sectional change in the longitudinal direction or a gradual change.

In another embodiment, such traction-impact devices are used in force transmission units. One application is in a coupling rod of a rail-bound vehicle, wherein in this instance one of the force transmission elements is at least indirectly connected to a coupling head and the other to a connection element on the carriage body.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiment of the invention and such exemplifications are not to be construed as limiting the scope of the invention in any manner.

DETAILED DESCRIPTION OF THE INVENTION

Figure 1A:
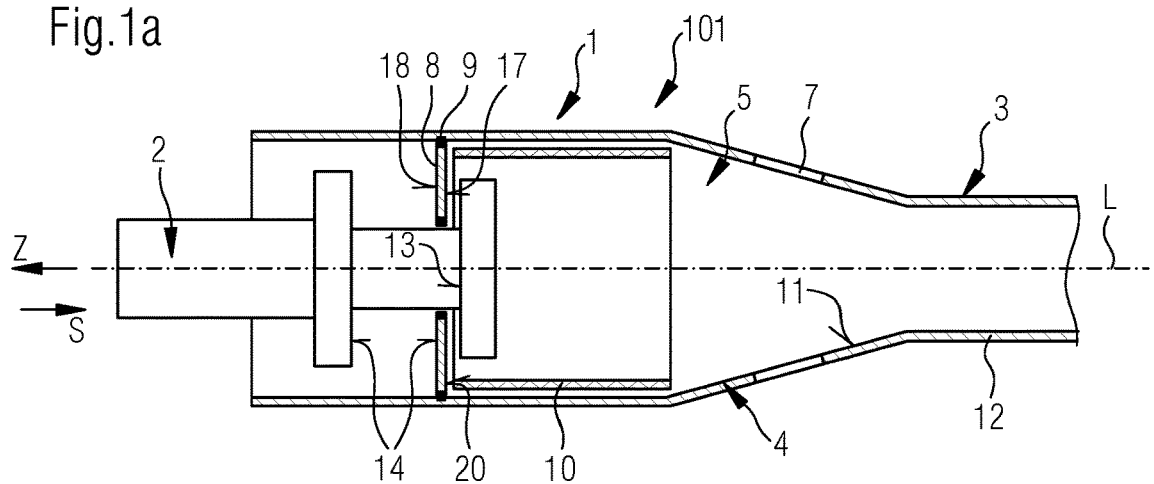
FIGS. 1a, 1b, and 1c illustrate in a schematically highly simplified illustration an embodiment of a traction-impact device, in which first force transmission element is formed by a pull rod.

The traction-impact devices 1 of embodiments according to the invention include at least two force transmission elements 2 and 3 which are arranged so as to extend along a theoretical longitudinal axis L which is orientated in the longitudinal direction of the traction-impact device 1 and at least in order to transmit traction forces, preferably also impact forces, are coupled to each other at least indirectly in a force-transmitting manner. The longitudinal direction corresponds in this instance to the direction in which the main direction components of the traction and impact forces are orientated. The coupling may be carried out in this instance directly or via transmission elements, in particular with damping elements being interposed. At least one of the two force transmission elements 2 or 3 forms an inner space 5 for at least partially receiving at least one irreversible energy absorption element 10. The energy absorption element 10 is at least partially, preferably completely formed from a fibre/plastics composite material. The force transmission element 2 or 3 which at least partially receives the energy absorption element 10 further has a nozzle portion 4 or forms it. The destructive energy absorption element 10 is in this instance at least partially received in such a manner by the force transmission element 2 or 3 which has a nozzle portion 4 that, in the event of a relative movement of the two force transmission elements 2, 3 in relation to each other which is carried out when a maximum impact force is exceeded, it is pressed through the nozzle portion 4 and in this instance is subjected to a destructive deformation and where applicable defibration.

The energy absorption element 10 may be introduced into the force transmission element either loosely, that is to say, free from a connection to the force transmission element which receives it, and is consequently not involved in the force transmission during normal operation. According to an alternative embodiment, it may also be secured to the force transmission element or be installed with pretensioning. The energy absorption element 10 is constructed as a cylindrical component, which is constructed in a peripheral direction about the longitudinal axis.

When a maximum permissible impact force is exceeded, there is brought about a cancellation of the force-transmitting connection between the two force transmission elements 2, 3 which enables the mentioned relative movement. The energy absorption element 10 is then either acted on directly by the other force transmission element in each case or indirectly by way of structural elements, on which this force transmission element acts and pressed through the nozzle portion 4. With respect to the discharge of the destroyed or defibrated material, there are in principle two possibilities. The first possibility has provision of openings 7 on the force transmission element which has the nozzle portion 4. These openings 7 are arranged downstream of the nozzle portion 4 in the impact force direction. The second possibility has an inner space which is intended to be provided inside the force transmission element.

The first and second force transmission elements 2, 3 may have a cylindrical or elliptical cross-section. The first and second force transmission elements are arranged coaxially relative to each other.

Figure 9:
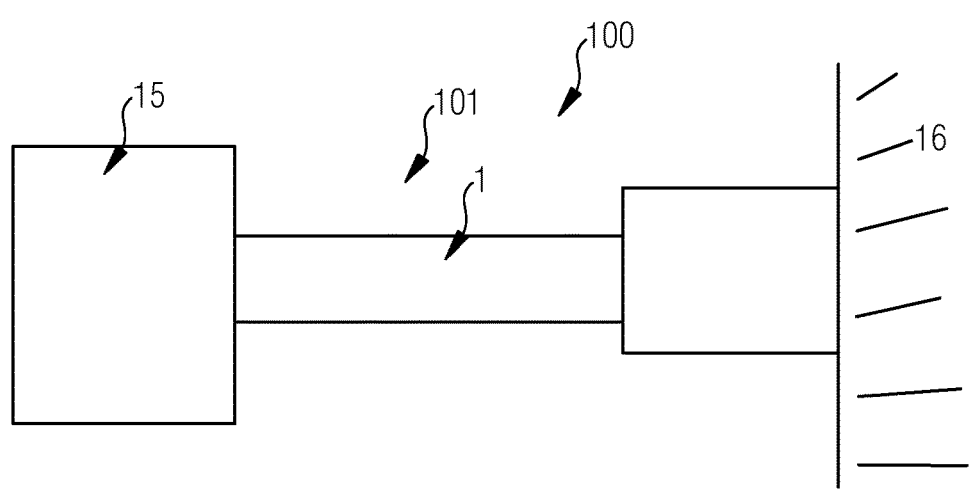
FIG. 9 illustrates an arrangement in a force transmission unit between a coupling head and a carriage body.

All embodiments may be constructed as traction-impact devices 1 of a force transmission unit 100 in the form of a coupling rod 101. The force transmission elements 2, 3 are in this instance formed by coupling rod elements. In this instance, a force transmission element 2 or 3 is at least indirectly connected to a coupling head which is not shown in this instance for coupling to a counter-coupling head. The other force transmission element 3 is then at least indirectly coupled or connected to a connection element for connection to the carriage body, for example, by way of an articulated arrangement. The force transmission element 2 may be constructed as a pull rod. The force transmission element 3 then forms the counter-element which is coupled to the pull rod. One arrangement possibility in a force transmission unit 100 between a coupling head 15 and a carriage body 16 is illustrated by way of example in FIG. 9.

Each of the force transmission elements 2, 3 may be constructed in one or several pieces.

FIGS. 1a-5 show in a schematically simplified illustration the basic structure and the basic function of different embodiments of a traction-impact device 1 according to a first embodiment. The basic structure is identical, for which reason the same reference numerals are used for the same elements.

Figure 1B:
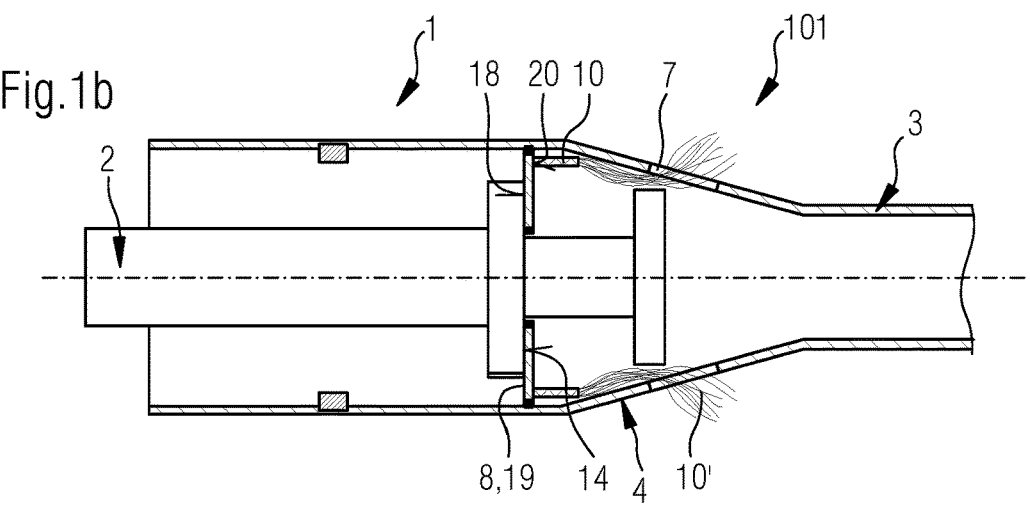
Figure 1C:
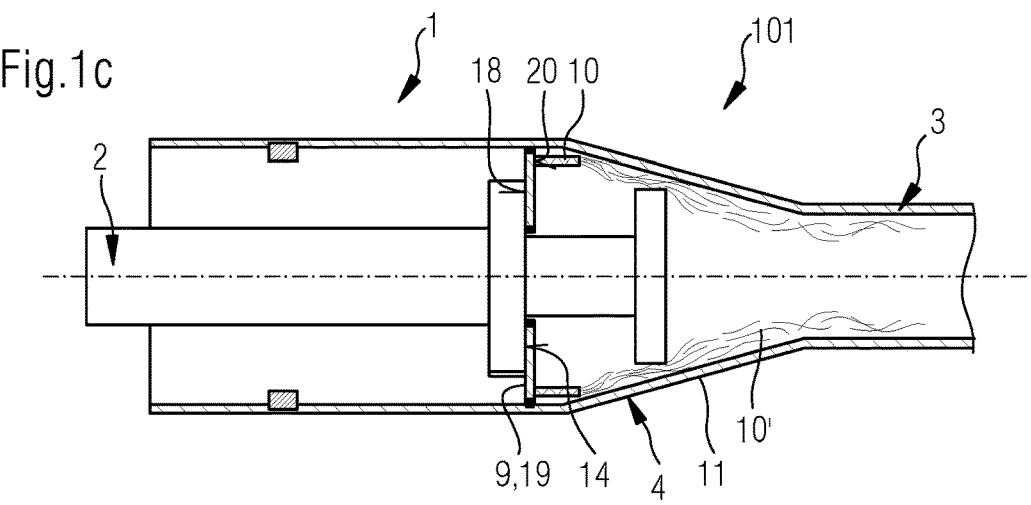

FIGS. 1a and 1b show in a schematically highly simplified illustration a first embodiment of a traction-impact device 1 according to the first embodiment in two functional positions. In this, the first force transmission element 2 is formed by a pull rod. The second force transmission element 3 is formed by a cylindrical element which extends along the longitudinal axis L with different cross-section regions. The cylindrical element surrounds in this instance an inner space when viewed in the peripheral direction about the longitudinal axis L. The nozzle portion 4 on the force transmission element 3 is formed either by the inner periphery 11 of the cylindrical element or by an additional component which is arranged in the inner space 5 and which is not illustrated in this instance and which is connected to the cylindrical element. The connection can be carried out in a non-positive-locking, positive-locking or materially engaging manner or by combining these connection types.

The first force transmission element 2 is in this instance when viewed over the extent thereof in the longitudinal direction at least partially received by the second force transmission element 3.

The first and second force transmission elements 2, 3 are connected to each other in a force-transmitting manner. That is to say, the force path extends over both elements. The connection is carried out according to FIG. 1a in such a manner that the force transmission element 2 under the influence of the traction force is supported with a traction stop 13 on the second force transmission element 3, in this instance on a pressure plate 8 which is formed by a separate component and which is connected thereto. The pressure plate 8 has to this end a traction force stop surface region 17. The connection between the pressure plate 8 and wall 12 of the force transmission element 3 may be carried out in a non-positive-locking, positive-locking or materially engaging manner. A combination is also conceivable. The connection is in this instance configured for a maximum permissible force, in particular traction force or impact force. There is integrated therein a desired breaking location 9 which responds when this maximum permissible force—traction or impact force—is exceeded and cancels the connection. Under the action of the traction force, the traction stop 13 is supported on the traction force stop surface region 17 and consequently transmits the force to the pressure plate 8 and to the cylindrical element via the connection thereto. If impact forces occur, the force transmission element 2 is moved relative to the force transmission element 3 in the impact force direction, that is to say, in this instance towards each other and moves into abutment with a pressure force stop 14 on a pressure force stop surface region 18 on the pressure plate 8. The pressure stop 14 and traction stop 13 are arranged offset from each other in an axial direction, that is to say, with spacing from each other. Depending on the size of the impact force, it is transmitted via the pressure plate 8 to the cylindrical element or, when the maximum permissible impact force is exceeded, the connection is cancelled by the desired breaking location 9 responding. The pressure plate 8 then acts as an impact element 19 for the energy absorption element 10. The pressure plate 8 is moved under the action of impact force in the direction of the energy absorption element 10 and acts thereon. The pressure plate 8 has to this end in the illustrated case an impact surface region 20. The impact surface region 20 is in the illustrated case arranged offset in a radial direction with respect to the traction force stop surface region 17. The energy absorption element 10 is pressed through the nozzle portion 4 and deformed or destroyed in an irreversible manner. The fragments which are produced in this instance may be discharged via openings 7 which are arranged downstream of the nozzle portion 4 in the impact force direction in the second force transmission element 3. This state is illustrated in FIG. 1b. It is also conceivable for a portion of the fragments and fibres or all of them to remain in the second force transmission element 3. In this instance, the second force transmission element 3 is constructed with an extended inner space which is arranged downstream of the nozzle portion 4 in the impact force direction, as illustrated by way of example in FIG. 1c.

In all the embodiments described above and below, depending on the construction of the force transmission element 2 in the form of the pull rod, portions thereof, in particular radial surface regions on the cross-sectional enlargements which form the traction and pressure stops 13, 14, can take on the function of guiding the pull rod during relative movement with respect to the force transmission element 3. The cross-sectional enlargements which form the traction and pressure stops 13, 14 are in this instance either formed integrally on the pull rod or are formed by separate components, in particular disc-like elements which are connected to the pull rod.

Figure 2:
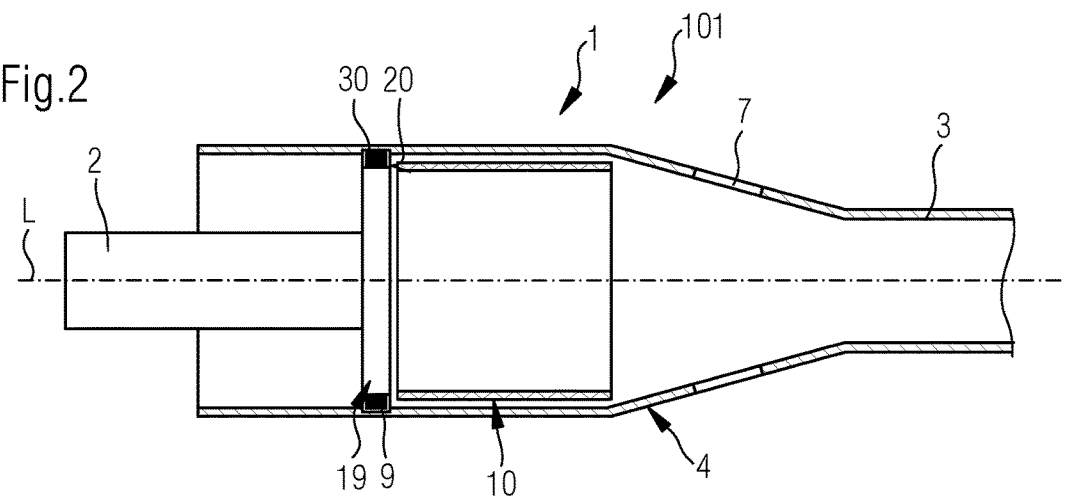
FIG. 2 illustrates a simplified embodiment according to FIG. 1a during normal operation or also in the unloaded state, in which the pressure plate is formed directly by the pull rod.

FIG. 2 shows a simplified embodiment according to FIG. 1a during normal operation or also in the unloaded state. In this embodiment, the pressure plate 8 is formed directly by the pull rod, that is to say, the first force transmission element 2. The force-transmitting connection 30 between the two force transmission elements 2, 3 is carried out directly. The force transmission element 2 is to this end constructed in the region of the end facing the force transmission element 3 with a cross-sectional enlargement. This forms the pressure plate 8 and at the same time the actuation element 19 for the energy absorption element 10. The desired breaking location 9 is integrated directly in the connection 30. This is, for example, achieved by shear elements connecting the pull rod or the pressure plate to the force transmission element 3. During normal operation, that is to say, when traction forces are transmitted and up to a maximum permissible impact force, these forces are transmitted via the connection between two force transmission elements. When a predefined maximum permissible impact force is exceeded, they respond and the connection is cancelled. The end portion of the pull rod or the region which forms the pressure plate 8 with the surface region 20 thereof now acts as an impact element 19 for the energy absorption element 10 and presses it through the nozzle portion 4 with the result shown in FIGS. 1b and 1c.

Figure 3:
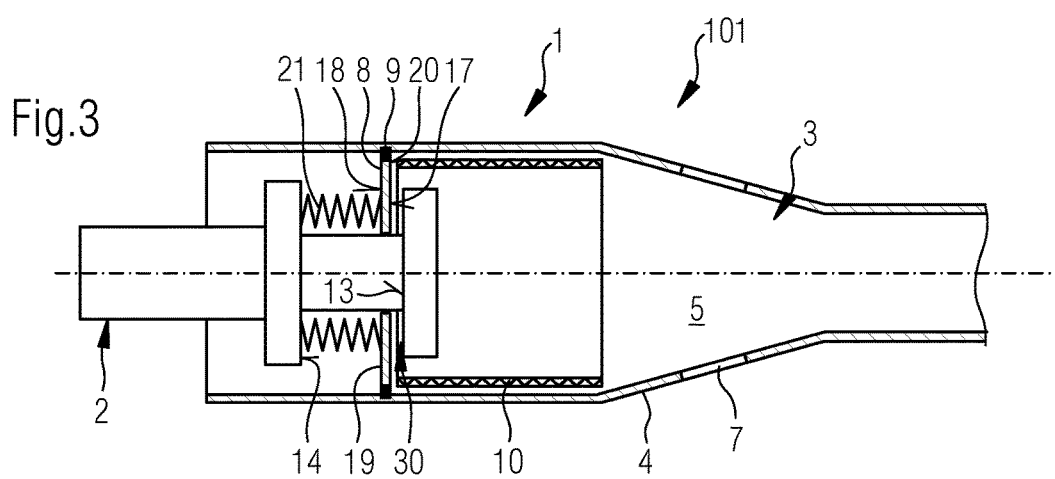
FIG. 3 illustrates an embodiment according to FIG. 1a with an additional reversible energy absorption device.
Figure 4:
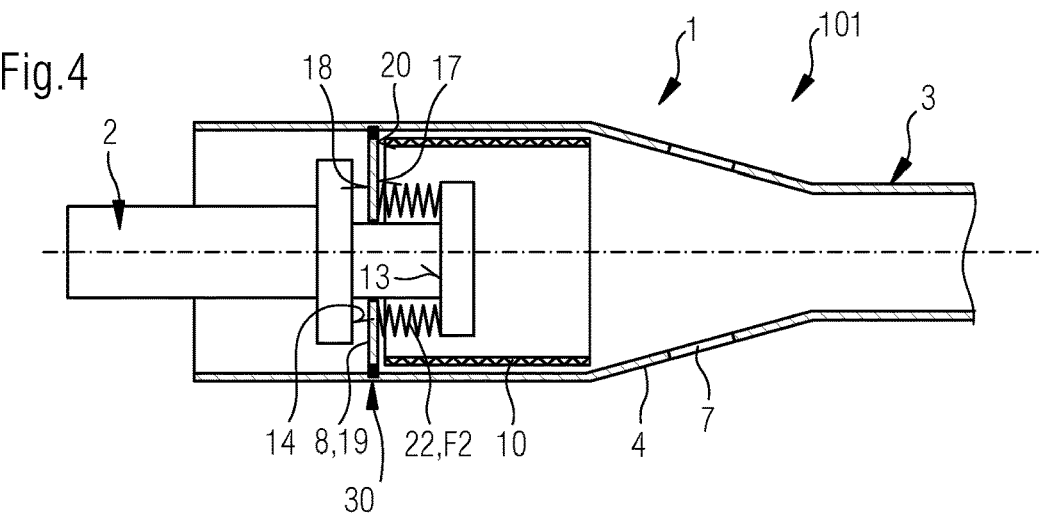
FIG. 4 illustrates another embodiment according to FIG. 1a with an additional reversible energy absorption device.

While FIGS. 1 and 2 show embodiments of traction-impact devices 1 with only destructive energy absorption, FIGS. 3 to 5 show developments with reversible energy absorption.

FIG. 3 shows an embodiment according to FIG. 1a with an additional reversible energy absorption device 21, in particular energy absorption element. When viewed in the direction of an impact force which is introduced via the pull rod, it is arranged upstream of the irreversible energy absorption element 10. The reversible energy absorption element 21 acts as a damper. This includes at least one resilient element F1. This may involve individual resilient elements, spring assemblies are also conceivable, in particular rubber spring assemblies, wherein one or more may be connected in series and/or in parallel. The reversible energy absorption device 21 is supported in this instance, on the one hand, on the force transmission element 2, in particular the pressure stop 14 of the pull rod and, on the other hand, on the pressure plate 8 or the force transmission element 3. That is to say, the impact forces are not transmitted directly to the force transmission element 3 but are instead damped by the resilient elements of the energy absorption device 21. The energy absorption device 21 is repositioned after the forces have been cancelled.

In contrast to the embodiment in FIG. 3, FIG. 4 shows a development according to FIG. 1a with an additional reversible energy absorption device 22. This device is when viewed in the direction of a traction force introduced via the pull rod arranged between a first and second force transmission element 2, 3. The reversible energy absorption device 22 acts as a damper and includes at least one resilient element F2. This may involve individual resilient elements, spring assemblies are also conceivable, in particular rubber spring assemblies, wherein one or more may be connected in series and/or in parallel. The reversible energy absorption device 22 is supported in this instance, on the one hand, on the force transmission element 2, in particular the traction stop 13 of the pull rod and, on the other hand, on the pressure plate 8 or the force transmission element 3. That is to say, the impact forces are not transmitted directly to the force transmission element 3 but are instead damped by the resilient elements of the energy absorption device 22. The energy absorption device 22 is repositioned after the forces have been cancelled.

Figure 5A:
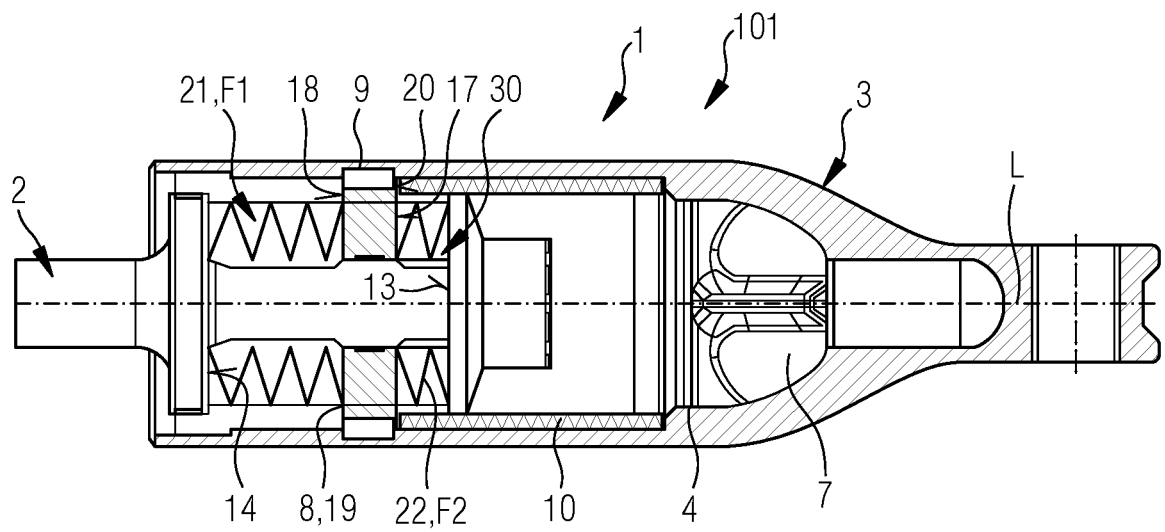
FIGS. 5a-5b illustrate another embodiment in which the connection element between the pressure plate and counter-element is in the form of shear bolts.
Figure 5B:
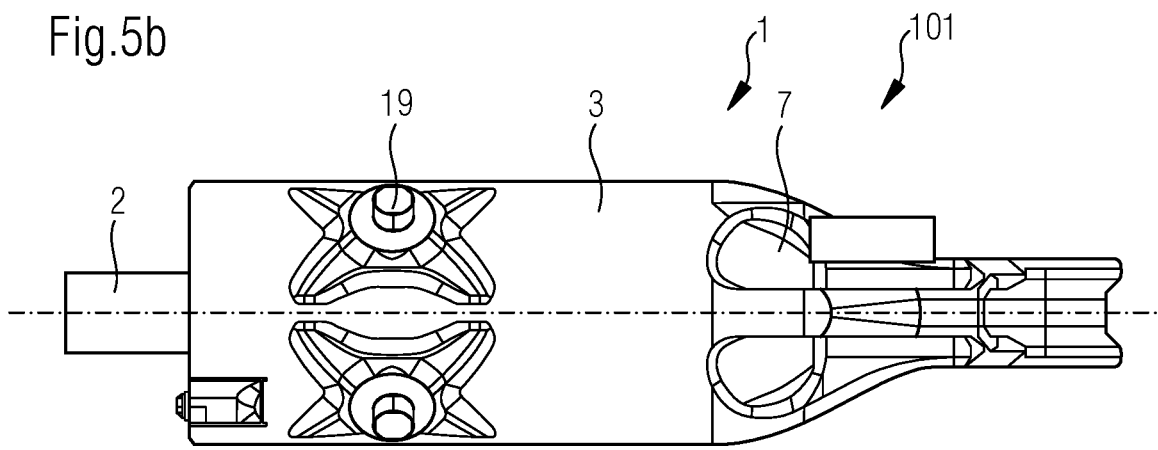

FIGS. 5a and 5b show a combination of the possibilities illustrated in FIGS. 1s-4 of the integration of reversible energy absorption. The construction illustrated in this instance represents a particularly compact and effective traction-impact device, which in addition to the destructive energy absorption element 10 provides a reversible energy absorption in both the traction and impact directions Z and S. The force transmission elements 2 and 3 are arranged coaxially relative to each other and are constructed in such a manner that one of the force transmission elements, in this instance the pull rod, can be received thereby with the end region thereof which is directed towards the other force transmission element 3 in the form of a counter-element. That is to say, the force transmission element 3 which acts as a counter-element forms an inner space 5 in which the end region of the pull rod is introduced. The force transmission element 3 is to this end constructed as a tubular element with a cylindrical or elliptical cross-section. The pressure plate 8 may be constructed as a disc-like or plate-like element and forms with the end sides thereof facing away from each other in each case a traction force stop surface region 17 and a pressure force stop surface region 18. The pressure plate 8 is connected to the counter-element by way of connection devices, for example shear elements which take on the function of the desired breaking location. The pull rod is guided through an opening of the pressure plate. The pressure plate 8 is when viewed in the longitudinal direction arranged between the traction stop 13 and pressure stop 14 of the pull rod. The reversible energy absorption in the traction and impact direction is produced by way of reversible energy absorption devices 21 and 22 in the form of resilient devices F1 and F2. In this instance, a reversible energy absorption device 22 is provided in the traction direction between the traction stop 13 and pressure plate 8, in particular the surface region 17. Another reversible energy absorption device 21 is provided between the pressure stop 14 and the surface region 18 on the pressure plate. The energy absorption device 21 is arranged functionally upstream of the irreversible energy absorption element 10, that is to say, until it reaches the maximum permissible critical impact force, impact forces which are introduced into the traction-impact device 1 can be dissipated by the reversible energy absorption device 21. Only after reaching the maximum permissible impact force does another increase bring about a cancellation of the connection between the first and second force transmission elements and a relative movement thereof in relation to each other. The resilient device F1 may then be in abutment. In this instance, the pressure plate is guided on the inner periphery 11 of the force transmission element 3 and acts on the energy absorption element 10 by pressing it through the nozzle portion 4.

The energy absorption element 10 is in the illustrated case constructed as a cylindrical sleeve, which is free from a connection to the force transmission element 3. This is when viewed in the longitudinal direction of the traction-impact device 1 only arranged between the first and second force transmission elements in a radial direction. In detail, the energy absorption element 10 may be constructed with an outer diameter which corresponds to the inner diameter of the force transmission element 3 in front of the nozzle portion or with a corresponding clearance fit relative thereto. This also applies in a similar manner to ensuring a guiding function for the pull rod for the region forming the traction stop on the pull rod. At least one clearance fit is provided between the outer periphery of this region and the inner periphery of the energy absorption element 10.

When viewed in the longitudinal direction, the irreversible energy absorption element 10 is arranged between the pressure plate 8 and nozzle portion 4. The arrangement is carried out when viewed in the impact direction downstream of the connection between the force transmission element 2 and 3 and upstream of the nozzle portion 4.

While FIG. 5a shows a partial section, FIG. 5b illustrates a view from the outer side. It is possible to see in this instance the connection elements between the pressure plate 8 and counter-element in the form of shear elements, in particular shear bolts.

Figure 6A:
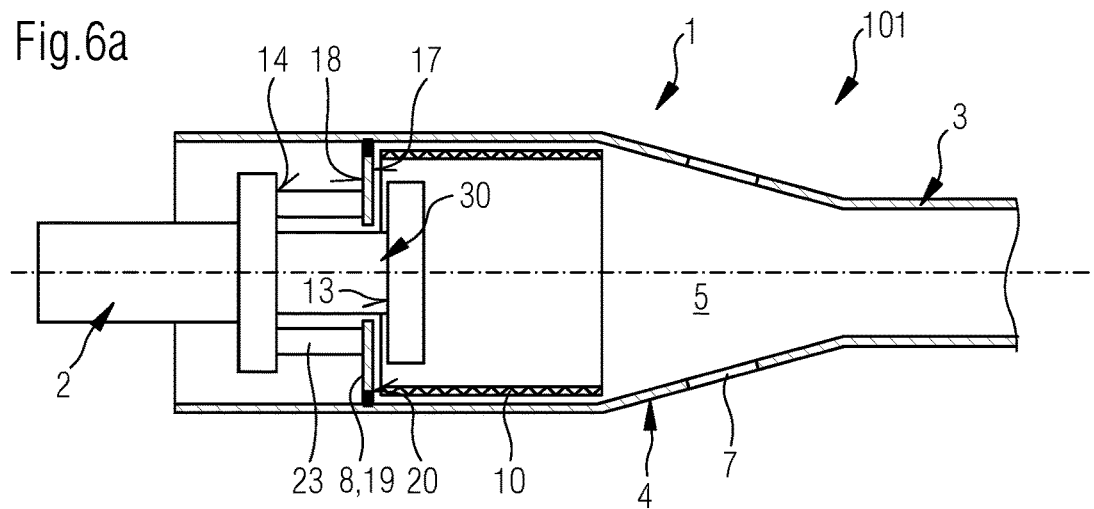
FIGS. 6a-6b illustrate further embodiments according to FIG. 3 and FIG. 4, respectively, wherein the energy absorption devices are hydraulic or gas hydraulic energy absorption devices.
Figure 6B:
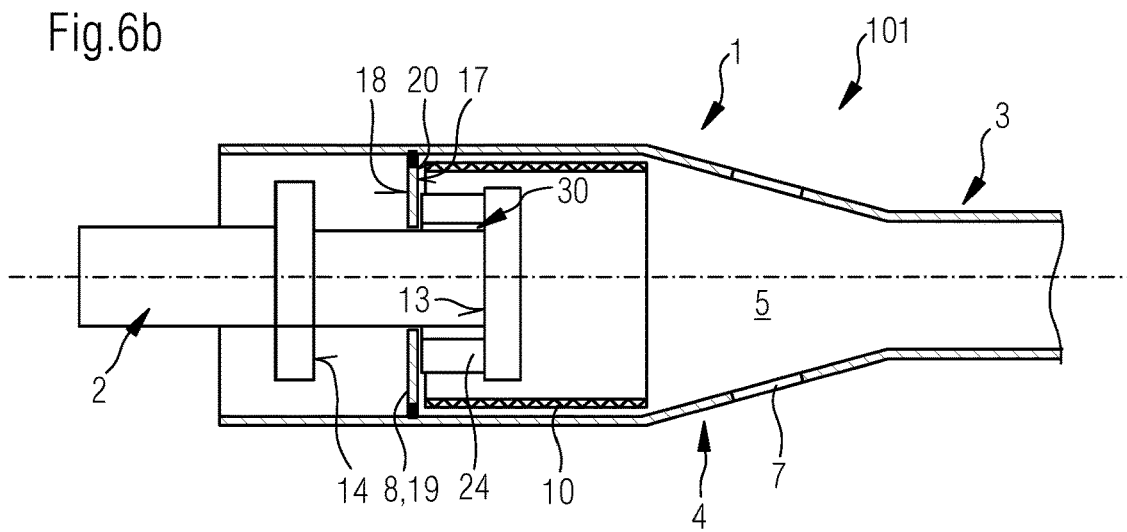
Figure 7:
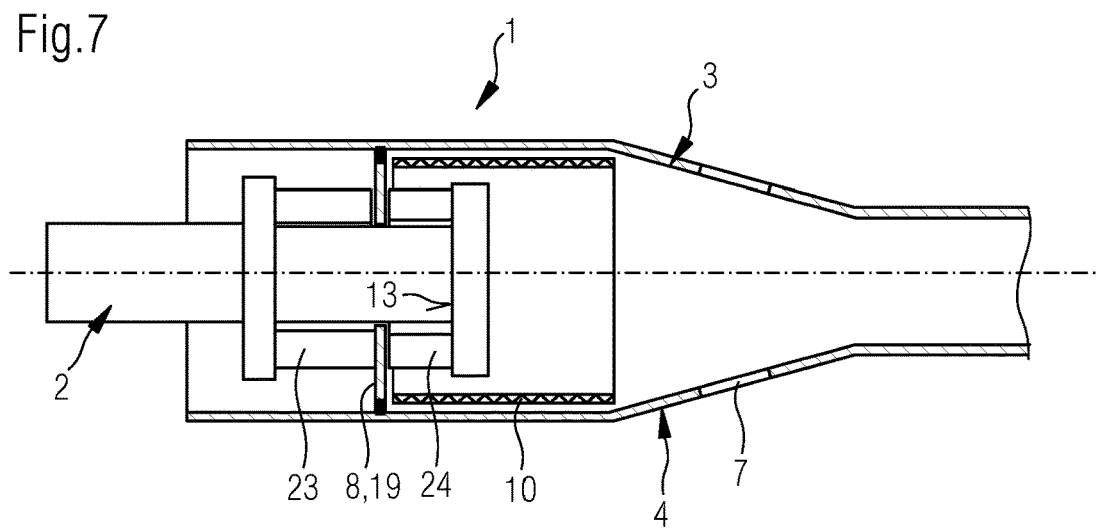
FIG. 7 illustrates a further embodiment according to FIG. 5a, wherein the energy absorption devices are hydraulic or gas hydraulic energy absorption devices.

FIG. 6a shows an embodiment according to FIG. 3. FIG. 6b shows an embodiment according to FIG. 4. FIG. 7 shows an embodiment according to FIG. 5a. The basic structure and the basic function correspond to those in FIGS. 3, 4 and 5a. The energy absorption devices 21 and 22 are, however, in this instance constructed as an energy absorption device which differs from resilient units and are therefore designated 23 and 24. These energy absorption devices may, for example, be hydraulic or gas hydraulic energy absorption devices. Combinations with resilient devices are also conceivable. Each of the energy absorption devices 21 and 22 may in this instance comprise a series or parallel arrangement of energy absorption elements.

Figure 8:
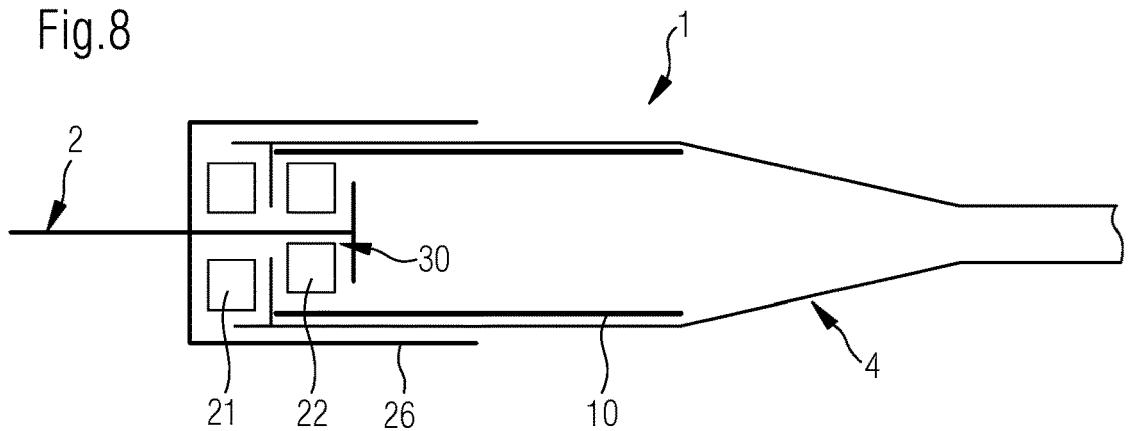
FIG. 8 illustrates a further embodiment according to FIG. 5a, wherein a region is additionally provided on the pull rod.

FIG. 8 shows a development of an embodiment according to FIG. 5a. In this development, a region 26 which surrounds the second force transmission element 3 at the end region directed towards the first force transmission element 2 in the peripheral direction over a part-region of the extent in the longitudinal direction is additionally provided on the pull rod. This region may additionally also be constructed as a deformation pipe and in the event of relative movement of the force transmission elements 2, 3 provide an additional energy absorption by way of expansion.

Figure 10:
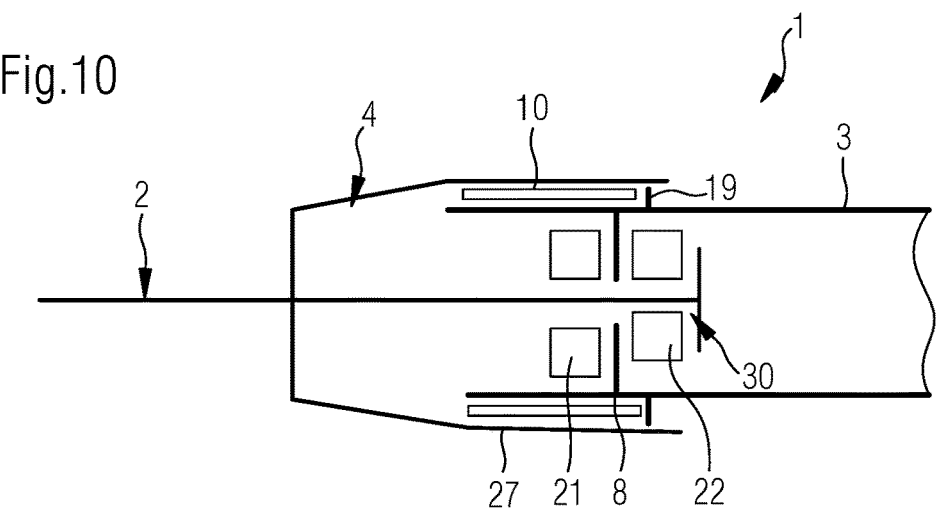
FIG. 10 illustrates another embodiment in which the irreversible energy absorption element is arranged on the outer periphery of the force transmission element.

FIG. 10 shows, in contrast, a second embodiment in which the irreversible energy absorption element 10 is arranged on the outer periphery of the force transmission element 3. The coupling 30 of the first force transmission element 2 which is constructed as a pull rod, the traction and pressure stops 13, 14 and the coupling of the pressure plate 8 to the second force transmission element 3 and the arrangement of the energy absorption between the pressure plate 8 and pull rod are carried out as described in FIG. 5. The nozzle portion 4 is, however, integrated in the first force transmission element 2. To this end, it has a sleeve-like portion 26, which surrounds the force transmission element 3 in a peripheral direction.

When a maximum permissible impact force is exceeded, the force-transmitting connection 30 between the force transmission element 2 and 3 is also cancelled by way of response of the desired breaking locations 9 between the pressure plate 8 and counter-element and the force transmission elements 2, 3 move with respect to each other. In this instance, the energy absorption element 10 is supported on a flange which extends around the outer periphery as an impact element 19 and is pressed through the nozzle portion 4 in the event of relative movement of the force transmission elements 2 and 3.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 Traction-impact device
2 Force transmission element
3 Force transmission element
4 Nozzle portion
5 Inner space
7 Through-opening
8 Pressure plate
9 Desired breaking location
10 Irreversible energy absorption element
11 Inner periphery
12 Wall
13 Traction stop
14 Pressure stop
15 Coupling head
16 Carriage body
17 Traction force stop surface region
18 Impact force stop surface region
19 Impact element
20 Surface region
21 Energy absorption device
22 Energy absorption device
23 Hydraulic, gas hydraulic energy absorption device
24 Hydraulic, gas hydraulic energy absorption device
26 Sleeve-like region
30 Force-transmitting coupling/connection
100 Force transmission unit
101 Coupling rod

What is claimed is:

1. A traction-impact device, for couplings of track-guided vehicles, comprising:
a first force transmission element including a nozzle portion;
a second force transmission element, the transmissions elements extend along a longitudinal axis and are connected to each other in a force-transmitting manner in order to transmit traction and impact forces and which, when a maximum permissible impact force is exceeded, can be moved relative to each other; and
an irreversible energy absorption device which is constructed and arranged so as to respond when the maximum permissible impact force is exceeded, the irreversible energy absorption device including at least one irreversible energy absorption element which at least partially includes a fiber composite material, and the irreversible energy absorption device is at least partially received by the first force transmission element, and the irreversible energy absorption element is arranged in such a manner with respect to the nozzle portion and the second force transmission element that, when an impact force which exceeds the maximum permissible impact force is introduced, the irreversible energy absorption element is pressed through the nozzle portion with at least partial defibration of the fiber composite material regions.

2. The traction-impact device according to claim 1, wherein the fiber composite material is a fiber plastic composite material.

3. The traction-impact device according to claim 1, wherein there is provided a hollow space region in at least one of: in the first force transmission element when viewed in the drive direction of the energy absorption element through the nozzle portion, in the region of the nozzle portion, and downstream of the nozzle portion, and the hollow space region is constructed and arranged so as to at least partially receive fibers or fragments which are produced when the irreversible energy absorption element is pressed through the nozzle portion.

4. The traction-impact device according to claim 1, wherein a hollow space region is provided in at least one of: in the first force transmission element when viewed in the drive direction of the energy absorption element through the nozzle portion, in the region of the nozzle portion, and downstream of the nozzle portion, and in a wall of the first force transmission element at least one through-opening is arranged in the peripheral direction of the first force transmission element and which extends through the wall from the hollow space region to the outer periphery, and wherein the through-opening is arranged and constructed so as to at least partially discharge fibers or fragments which are produced when the irreversible energy absorption element is pressed through the nozzle portion.

5. The traction-impact device according to claim 1, wherein at least one of a response behaviour of the irreversible energy absorption element and a value of the impact energy which can be consumed by the irreversible energy absorption element can be adjusted in advance as a function of at least one of the parameters of the energy absorption element:
   fiber architecture and layer structure;
   shape;
   sizing;
   length; and
   wall thickness.

6. The traction-impact device according to claim 1, wherein the individual irreversible energy absorption element is constructed as an element selected from at least one of a hollow member, having one of a cylindrical and an elliptical cross-section, a sleeve, and a solid profile element.

7. Traction-impact device according to claim 1, wherein the irreversible energy absorption device includes a plurality of irreversible energy absorption elements which are arranged in series.

8. The traction-impact device according to claim 1, wherein the irreversible energy absorption device includes a plurality of energy absorption elements which are arranged parallel with each other, wherein the individual energy absorption elements which are arranged parallel with each other are arranged coaxially with each other.

9. The traction-impact device according to claim 1, wherein the first force transmission element which has the nozzle portion has a large number of individual nozzle elements which are arranged in the peripheral direction about the longitudinal axis and the irreversible energy absorption device includes a plurality of irreversible energy absorption elements which are arranged parallel with each other, wherein the energy absorption elements are arranged and constructed in the peripheral direction spaced apart from each other about the longitudinal axis so as to be pressed through the individual nozzle elements when the maximum permissible impact force is exceeded.

10. The traction-impact device according to claim 1, wherein the individual irreversible energy absorption element is arranged outside a force path and is guided on the first force transmission element in a manner free from a connection thereto.

11. The traction-impact device according to claim 1, wherein the individual irreversible energy absorption element is guided on the second force transmission element or an element which is at least indirectly acted on by the second force transmission element.

12. The traction-impact device according to claim 1, wherein the individual irreversible energy absorption element is one of:
   secured to the first force transmission element; and
   arranged in a pretensioned manner between the first force transmission element and the second force transmission element or an element which is at least indirectly acted on by the second force transmission element, in order to act on the irreversible energy absorption element.

13. The traction-impact device according to claim 1, wherein in a force-transmitting connection of the force transmission elements, there is provided at least one desired breaking location which responds at the maximum permissible impact force and which, with the force-transmitting connection being cancelled, permits a relative movement of the first and second force transmission elements with respect to each other, wherein the desired breaking location is formed by connection devices.

14. The traction-impact device according to claim 1, wherein the first force transmission element is constructed as a hollow member which is open at least at one side and the second force transmission element is constructed as a pull rod, wherein the pull rod is received by the first force transmission element with the end region thereof facing the first force transmission element.

15. The traction-impact device according to claim 1, wherein a force-transmitting connection between the first and second force transmission elements is carried out directly and in the force-transmitting connection there is integrated a desired breaking location which responds at the maximum permissible impact force and which, with the force-transmitting connection being cancelled, permits a relative movement of the first and second force transmission elements with respect to each other.

16. The traction-impact device according to claim 1, further comprising a damping device, wherein a force-transmitting connection between the first and second force transmission elements is carried out in one of a traction force direction and an impact force direction, with the damping device being interposed.

17. The traction-impact device according to claim 16, wherein the damping device is constructed as a device selected from one of:
   a resilient device including resilient elements and spring assemblies;
   a gas hydraulic damping device; and
   a hydrostatic damping device.

18. The traction-impact device according to claim 1, wherein there is provided a disc-like or plate-like element which forms a pressure plate and which is arranged coaxially with the first force transmission element and which is connected to the first force transmission element in an impact direction upstream of the nozzle portion when viewed in a longitudinal direction, and forms a surface region for acting on the irreversible energy absorption element, wherein the pressure plate forms at sides thereof facing away from each other in each case surface regions for cooperation with a traction or pressure stop of the second force transmission element, wherein a connection between the pressure plate and the first force transmission element has a desired breaking location which responds when the maximum permissible impact force is exceeded with a force-transmitting connection between the first and second force transmission elements being cancelled.

19. A force transmission unit for use in rail-bound vehicles, comprising:
   a traction-impact device, comprising:
      a first force transmission element including a nozzle portion;
      a second force transmission element, the transmissions elements extend along a longitudinal axis and are connected to each other in a force-transmitting manner in order to transmit traction and impact forces and which, when a maximum permissible impact force is exceeded, can be moved relative to each other; and
      an irreversible energy absorption device which is constructed and arranged so as to respond when the maximum permissible impact force is exceeded, the irreversible energy absorption device including at least one irreversible energy absorption element which at least partially includes a fiber composite material, and the irreversible energy absorption device is at least partially received by the first force transmission element, and the irreversible energy absorption element is arranged in such a manner with respect to the nozzle portion and the second force transmission element that, when an impact force which exceeds the maximum permissible impact force is introduced, the irreversible energy absorption element is pressed through the nozzle portion with at least partial defibration of the fiber composite material regions.

20. The force transmission unit according to claim 19, wherein the force transmission unit is a coupling rod.

* * * * *